United States Patent
Becht

(10) Patent No.: US 6,727,984 B2
(45) Date of Patent: Apr. 27, 2004

(54) MULTICHANNEL RECEIVER SYSTEM FOR ANGULARLY RESOLVED LASER RANGING MEASUREMENT

(75) Inventor: Hubert Becht, Langenenslingen (DE)

(73) Assignee: Zeiss Optronik GmbH (DE)

( * ) Notice: Subject to any disclaimer, the term of this patent is extended or adjusted under 35 U.S.C. 154(b) by 0 days.

(21) Appl. No.: 10/334,885

(22) Filed: Dec. 30, 2002

(65) Prior Publication Data

US 2003/0133094 A1 Jul. 17, 2003

(30) Foreign Application Priority Data

Jan. 8, 2002 (DE) .......................................... 102 00 366

(51) Int. Cl.$^7$ ............................ G01C 3/08; G01B 11/26
(52) U.S. Cl. ................. 356/5.01; 356/141.1; 356/141.5
(58) Field of Search ............................ 356/5.01, 141.5, 356/141.1, 4.01–5.15

(56) References Cited

U.S. PATENT DOCUMENTS

| | | |
|---|---|---|
| 4,380,391 A | 4/1983 | Buser et al. |
| 4,674,874 A * | 6/1987 | Halldorsson et al. |
| 5,079,414 A * | 1/1992 | Martin |
| 6,246,822 B1 | 6/2001 | Kim et al. |

FOREIGN PATENT DOCUMENTS

EP  1 154 639 A1  9/2001

OTHER PUBLICATIONS

Krug et al., Application of a 6×8 Silicon APD Array and Hybrid Electronics for Scannerless 3D Imaging Ladar, NATO/IRIS Active Systems, 1995, vol. 11, pp. 79–89.

H.N. "Buck" Burns et al., Compact Multichannel Receiver Using InGaAs APDs for single pulse, eye–safe, laser radar imagery, 1997, SPIE vol. 3065, 1997, pp. 22–29.

* cited by examiner

*Primary Examiner*—Stephen C. Buczinski
(74) *Attorney, Agent, or Firm*—Wells St. John P.S.

(57) ABSTRACT

The invention relates to a multichannel receiver system (1) for angularly resolved laser ranging measurement, in which a laser light pulse from a laser (7) using the pulse travel time method is used to measure the ranges of a plurality of target points (6) by means of an array (2) comprising a plurality of apertures (3), of a photodetector (9) and of an evaluation circuit (10). The laser light pulses entering each of the apertures (3) and reflected by the target points (6) are distributed in a preselected distribution ratio between at least two optical fibers (511 to 543) with an individual length which corresponds to a light travel time $t_{n,m}$, and are subsequently received by the photodetector (9) and are processed in the evaluation circuit (10). A unique assignment of the pulses to the respective apertures (3) is rendered possible by their spacings, specified in accordance with the distribution, and amplitudes. The ranges of the target points (6) can thereby be determined.

16 Claims, 1 Drawing Sheet

MULTICHANNEL RECEIVER SYSTEM FOR ANGULARLY RESOLVED LASER RANGING MEASUREMENT

CROSS REFERENCE TO RELATED APPLICATION

This application relates to and claims priority to corresponding Germany Patent Application No. 102 00 366.1, which was filed on Jan. 8, 2002, and which is incorporated by reference herein.

BACKGROUND OF THE INVENTION

1. Field of the Invention

The invention relates to a multichannel receiver system for angularly resolved laser ranging measurement, in which a laser light pulse from a laser using the pulse travel time method is used to measure the ranges of a plurality of target points by means of an array comprising a plurality of apertures, of a photodetector and of an evaluation circuit.

2. Description of the Related Art

In the case of pulse travel time methods, the time between the emission and the reception of a laser pulse reflected by the target is measured, the duration of whose pulse is typically a few nanoseconds.

Rangefinders that can determine the range of a plurality of target points with the aid of a single laser pulse are particularly well suited for a number of applications. It is possible by the accurate measurement of the range of a plurality of target points to derive statements on the shape and the type of the target that can render automatic detection of the target possible.

A multichannel receiver system for angularly resolved laser ranging measurement, in which a laser light pulse from a laser using the pulse travel time method is used to measure the ranges of a plurality of target points by means of an array comprising a plurality of apertures, of a photodetector and of an evaluation circuit, is disclosed, for example, in U.S. Pat. No. 4,380,391. Here, an array of optical fibers can be fitted in the receiving plane, the individual optical fibers thereof having different lengths and being coupled to a single photodetector. It is possible thereby to use a suitable time division multiplex method to assign the individual detector signals to the respective receiver visual fields. Only a single evaluation circuit is required in the case of this method. This eliminates the different tolerances on a plurality of evaluation circuits. A disadvantage to date has been the difficult assignment of the detector signals to the respective receiver visual fields in the case of marked differences in range between the respective target points. It can happen in general that the sequence of the detector signals no longer corresponds to the sequence of the fiber length, and that an accurate assignment of the pulses to the specific visual fields thereby becomes impossible. Existing solutions to this problem are, for example, the lengthening of the respective optical fibers (for example a few hundred meters), in order to obtain a better assignment thereby. The complexity thereby arising and the large overall size of the multichannel receiver systems are very disadvantageous.

Reference may be made to "Krug et al., Application of a 6×8 Silicon APD Array and Hybrid Electronics for Scannerless 3D Imaging Ladar, NATO/IRIS Active Systems, 1995, Vol. II, pages 79 to 89" concerning the further general prior art with reference to the implementation of the multichannel receiver. Here, a photodiode array can be fitted directly in the receiving plane. Each individual photodiode of this array then has a dedicated evaluation circuit.

Moreover "Burns and Yun, Compact, multichannel receiver using InGaAs APDs for single pulse, eye-safe, laser radar imagery, SPIE Vol. 3065, 1997, pages 22 to 29" exhibits an array of optical fibers that is fitted in the receiving plane and whose individual optical conductors are coupled to discrete photodetectors. Each of these photodetectors has a dedicated evaluation circuit here, as well.

A disadvantage in the two previously mentioned systems relating to the further general prior art is that the respective evaluation circuits have different electronic components, and therefore different tolerances can occur in each case in the determination of the measuring points.

SUMMARY OF THE INVENTION

It is therefore the object of the present invention to provide a multichannel receiver system for angularly resolved laser ranging measurement that removes the above-described disadvantages of the prior art, in particular a multichannel receiver system of small overall size and low complexity, in the case of which the signals detected with the aid of a photodetector can be uniquely assigned to the individual receiver visual fields, and an improved accuracy of the ranging measurement is achieved in conjunction with an identical evaluation circuit for all receiver visual fields.

This object is achieved according to the invention by virtue of the fact that the laser light pulses entering each of the apertures and reflected by the target points are distributed in a preselected distribution ratio between at least two optical fibers with an individual length which corresponds to a light travel time $t_{n,m}$, are subsequently received by the photodetector and are processed in the evaluation circuit, a unique assignment of the pulses to the respective apertures being rendered possible by their spacings, specified in accordance with the distribution, and amplitudes, and it thereby being possible to determine the ranges of the target points.

A multichannel receiver system of small overall size and low complexity can be constructed by these measures, since only one photodetector and one evaluation circuit are required. Particularly advantageous is the possibility of uniquely assigning the signals detected with the aid of a single photodetector to the individual receiver visual fields. This is achieved in a simple way by virtue of the fact that for the purpose of assignment an individual item of additional information is impressed on the pulses owing to the specific length differences between the respective fibers and to the characteristic pulse amplitudes thereof, which are prescribed by the respective distribution ratios. A further advantage of the method stems from the fact that the statistical accuracy of the pulse travel time measurement, and thus of the ranging measurement, is increased in the case of measurement of a plurality of pulses from the same target.

Advantageous refinements and developments of the invention emerge from the subclaims and from the following exemplary embodiment described in principle below with the aid of the drawing.

DETAILED DESCRIPTION

Figure 1:
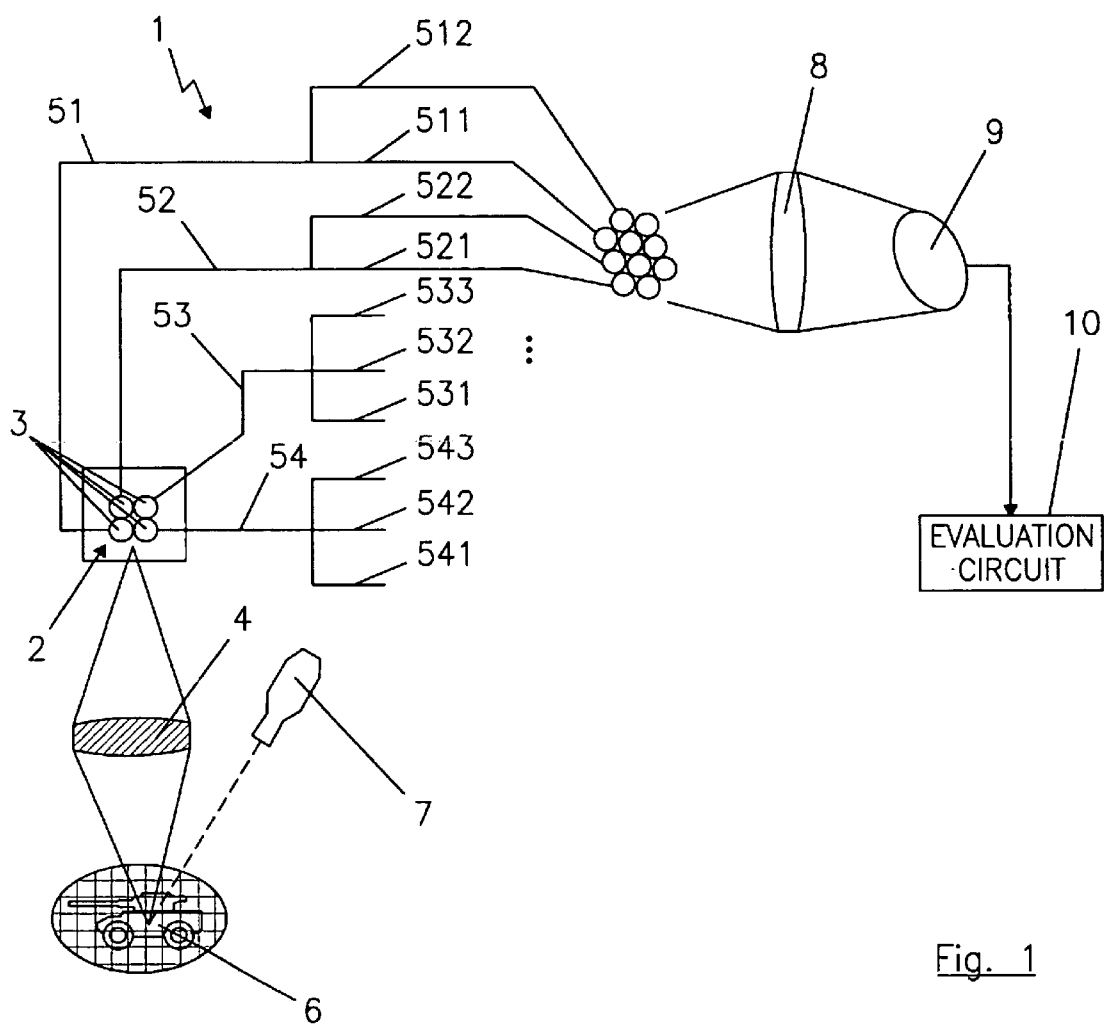
FIG. 1 shows the principle of a design of a multichannel receiver system according to the invention.

As may be seen from FIG. 1, a multichannel receiver system 1 has an array 2 consisting of four individual apertures or aperture stops 3 in the imaging plane of a receiving optical system 4. The apertures 3 are constructed as a 2×2 matrix of n ends, arranged directly next to one another, of optical fibers 51 to 54. The optical fibers 51 to 54 distribute the light of a laser 7, entering the apertures 3 and reflected by target points 6 (and indicated in FIG. 1 with dashes), between a further ten optical fibers 511 to 543 each with an individual or different length which corresponds to a light travel time of $t_{1\ldots4,1\ldots3}$, the entering laser light being distributed in a preselected distribution ratio by branching onto the optical fibers 511 to 543, that is to say having a relative amplitude in the respective optical fibers (see following table).

| Aperture No. | Fiber No. | Length | Relative amplitude |
|---|---|---|---|
| 51 | 1 | 1 m | 0.5 |
| 51 | 2 | 5 m | 0.5 |
| 52 | 1 | 31 m | 0.4 |
| 52 | 2 | 37 m | 0.6 |
| 53 | 1 | 61 m | 0.2 |
| 53 | 2 | 68 m | 0.3 |
| 53 | 3 | 76 m | 0.5 |
| 54 | 1 | 91 m | 0.4 |
| 54 | 2 | 101 m | 0.2 |
| 54 | 3 | 110 m | 0.4 |

The laser 7 used in the present exemplary embodiment generates light of wavelength 1.5 μm with a pulse duration of 10 ns and a beam divergence of 500 μrad.

The laser light pulses emerging from the m>2 optical fibers 511 to 545 are concentrated onto the photodetector 9 by an optical coupling system 8. The optical coupling system 8 permits a 2:1 reducing imaging in the present exemplary embodiment. The output signal of the photodetector 9 is fed into the evaluation circuit 10. The photodetector 9 used is constructed as an InGaAs-PIN photodiode with an active surface of 200 μm diameter. The bandwidth is approximately 40 mHz. The output signal of the photodetector 9 has pulses at instants $t_0+t_{1,1} \ldots t_0+t_{4,3}$, $t_0$ denoting the light travel time that results from the range of the target point 6, and which can be determined from the known light travel times $t_{1,1}, \ldots t_{4,3}$. The pulses in each case have a characteristic amplitude $A_{1\ldots4,1\ldots3}$ that results from the distribution ratio of the optical fibers 511 to 543.

Each aperture 3 can now be assigned a plurality of pulses, specifically at the times $t_0+t_{1\ldots4,1} \ldots t_0+t_{1\ldots4,2\ldots3}$ with characteristic amplitudes of $A_{1\ldots4,1} \ldots A_{1\ldots4,2\ldots3}$, it being possible again in this embodiment to assign the pulses to the respective apertures 3 according to the distribution.

The range of the target points 6 is now determined in the evaluation circuit 10, or the pulse groups are assigned to the respective apertures 3. In the present exemplary embodiment, the optical fibers 511 to 543 are constructed as quartz glass fibers with a step index and core-cladding diameters of 100/110 μm.

Figure 2:
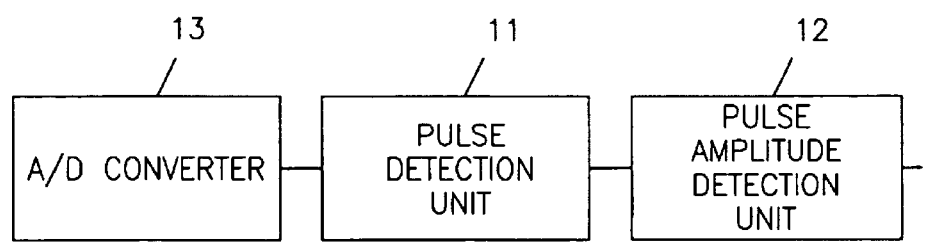
FIG. 2 shows the principle of a flowchart of an evaluation circuit.

As may be seen from FIG. 2, the evaluation circuit 10 has a pulse detection unit 11, a pulse amplitude detection unit 12 and an optional A/D converter 13 (indicated by dashes in FIG. 2), which digitizes the analog output signal of the photodetector 9. The output signal, digitized by the A/D converter 13, of the photodetector 9 is analyzed in the pulse detection unit 11 by firstly determining the instants at which a pulse occurs in the digitized output signal of the photodetector 9, a threshold value method or a correlation method, for example cross correlation, being applied here in an advantageous way. The characteristic pulse amplitude $A_{1\ldots4,1\ldots3}$ is measured in the pulse amplitude detection unit 12 for each pulse at the instant determined in the pulse detection unit 11, a direct analysis of the digitized output signal of the photodetector 9 being performed in order to determine this characteristic pulse amplitude $A_{1\ldots4,1\ldots3}$.

In another exemplary embodiment without A/D converter 13, a direct analysis of the analog output signal of the photodetector 9 can be performed, for example, with the aid of a threshold value detection and subsequent pulse peak value detection. The situation is similar with the pulse detection unit 11 upon dispensing with an A/D converter 13.

What is claimed is:

1. A multichannel receiver system for angularly resolved laser ranging measurement, in which a laser light pulse from a laser using the pulse travel time method is used to measure the ranges of a plurality of target points, the system comprising:

an array comprising a plurality of apertures;

a photodetector;

an evaluation circuit; and wherein laser light pulses enter each of the apertures after being reflected by said target points and are distributed in a preselected distribution ratio between at least two optical fibers with an individual length which corresponds to a light travel time $t_{n,m}$, and wherein said laser light pulses are subsequently received by said photodetector and are processed in said evaluation circuit, and wherein a unique assignment of the pulses to said respective apertures is rendered possible by respective spacing of said laser light pulses and, said laser light pulses are specified in accordance with the distribution; and respective amplitudes wherein it is possible to determine the ranges of said target points.

2. The multichannel receiver system as claimed in claim 1, wherein said apertures are constructed as a number of n optical fiber ends; arranged next to one another.

3. The multichannel receiver system as claimed in claim 2, wherein the light pulses emerging from the at least two optical fibers are concentrated onto said photodetector by an optical coupling system.

4. The multichannel receiver system as claimed in claim 1, wherein the output signal of said photodetector has pulses at instants $t_0+t_{1,1} \ldots t_0+t_{n,m}$, $t_0$ denoting the light travel time that results from the range of said target point, and which can be determined from the known light travel times $t_{1,1} \ldots t_{n,m}$.

5. The multichannel receiver system as claimed in claim 4, wherein the pulses of the output signal of said photodetector in each case have characteristic pulse amplitudes $A_{n,m}$ that result from the distribution ratio.

6. The multichannel receiver system as claimed in claim 5, wherein each aperture can be assigned a plurality of pulses, specifically at the times $t_0+t_{n,1} \ldots t_0+t_{n,m}$ with characteristic amplitudes of $A_{n,1} \ldots A_{n,m}$, it being possible again to assign the pulses to the respective apertures according to the distribution given a preselected choice of n,m, $t_{n,m}$ and the distribution ratio.

7. The multichannel receiver system as claimed in claim 1, wherein said evaluation circuit has a pulse detection unit and a pulse amplitude detection unit.

8. The multichannel receiver system as claimed in claim 1, wherein said evaluation circuit has an A/D converter.

9. The multichannel receiver system as claimed in claim 7, wherein the output signal of said photodetector is analyzed in the pulse detection unit by firstly determining the instants at which a pulse occurs in the output signal of said photodetector, by means of a threshold value method or a correlation method being applied for this purpose.

10. The multichannel receiver system as claimed in claim 7, wherein the characteristic pulse amplitude $A_{n,m}$ is measured in said pulse amplitude detection unit for each pulse at the instant determined in said pulse detection unit.

11. The multichannel receiver system as claimed in claim 10, wherein the determination of said characteristic pulse amplitude $A_{n,m}$ is performed in said pulse amplitude detection unit by direct analysis of the analog output signal of said photodetector.

12. The multichannel receiver system as claimed in claim 11, wherein the direct analysis of the analog output signal of said photodetector is performed by means of a threshold value detection with subsequent pulse peak value detection.

13. The multichannel receiver system as claimed in claim 8, wherein the analog output signal of said photodetector is digitized by said A/D converter.

14. The multichannel receiver system as claimed in claim 13, wherein said output signal, digitized by said A/D converter, of said photodetector is analyzed in said pulse detection unit by firstly determining the instants at which a pulse occurs in the output signal of said photodetector, by means of a threshold value method or a correlation method being applied for this purpose.

15. The multichannel receiver system as claimed in claim 14, wherein the determination of said characteristic pulse amplitude $A_{n,m}$ is performed in said pulse amplitude detection unit with the aid of suitable algorithms on the output signal, digitized by said A/D converter, of said photodetector.

16. The multichannel receiver system as claimed in claim 1, wherein said optical fibers are constructed as multimode optical fibers with a step index.

* * * * *

UNITED STATES PATENT AND TRADEMARK OFFICE
CERTIFICATE OF CORRECTION

PATENT NO.   : 6,727,984 B2
DATED        : April 27, 2004
INVENTOR(S)  : Hubert Becht It is certified that error appears in the above-identified patent and that said Letters Patent is hereby corrected as shown below:

Column 4,
Line 33, replace "pulses are specified in accordance with the distribution;" with
-- pulses are specified in accordance with the distribution --
Line 38, replace "optical fiber ends; arranged next to one another." with -- optical fiber ends arranged next to one another. --

Column 5,
Line 1, replace "photodetector, by means of a threshold value method or a" with
-- photodetector by means of a threshold value method or a --

Column 6,
Line 5, replace "pulse occurs in the output in the signal of said photodetector, by" with
-- pulse occurs in the output signal of said photodetector by --

Signed and Sealed this

Nineteenth Day of April, 2005

JON W. DUDAS
*Director of the United States Patent and Trademark Office*